Feb. 9, 1926.
J. F. SULLIVAN
1,572,051
MOTOR VEHICLE
Filed June 13, 1925   2 Sheets-Sheet 2
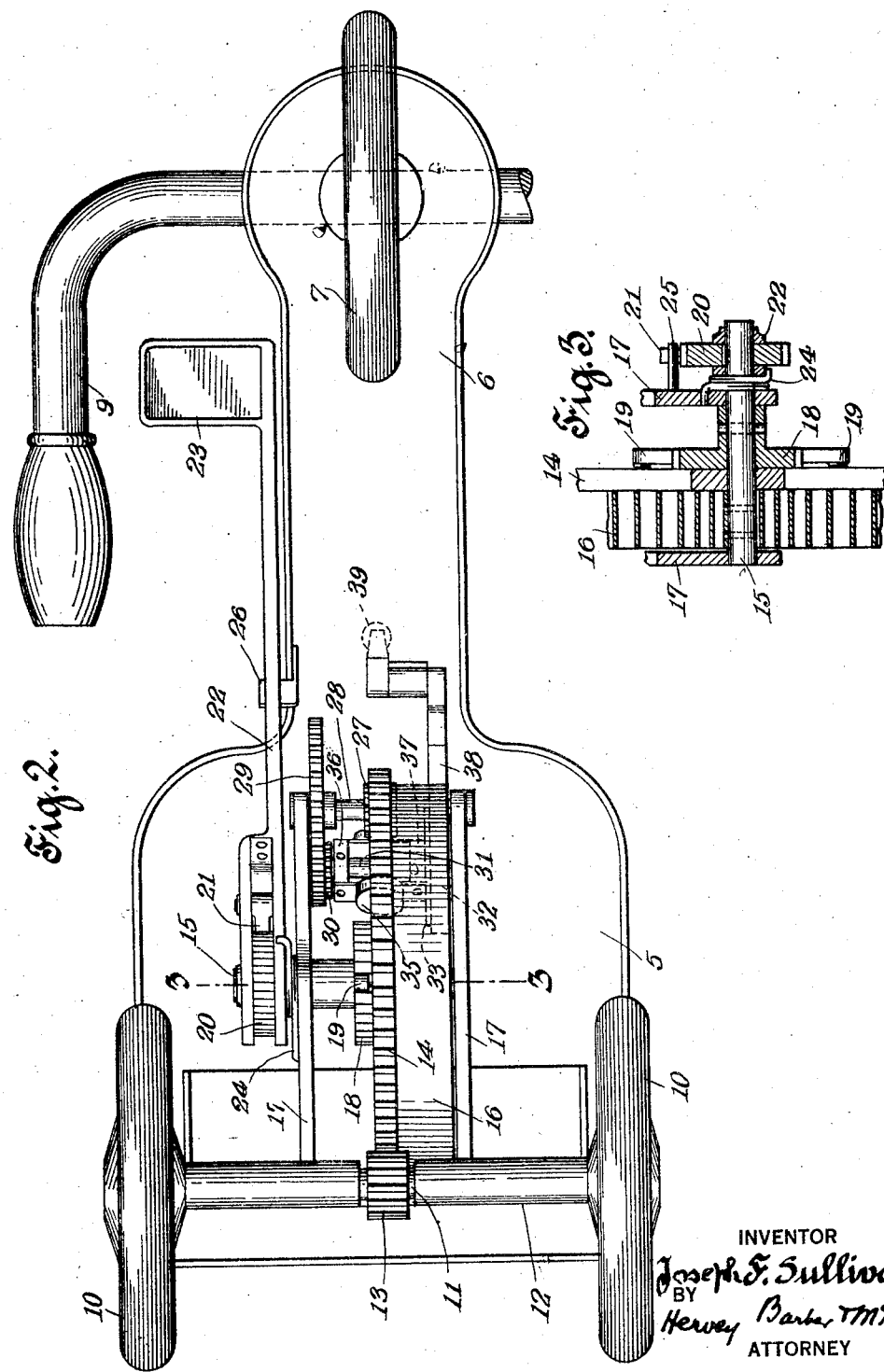

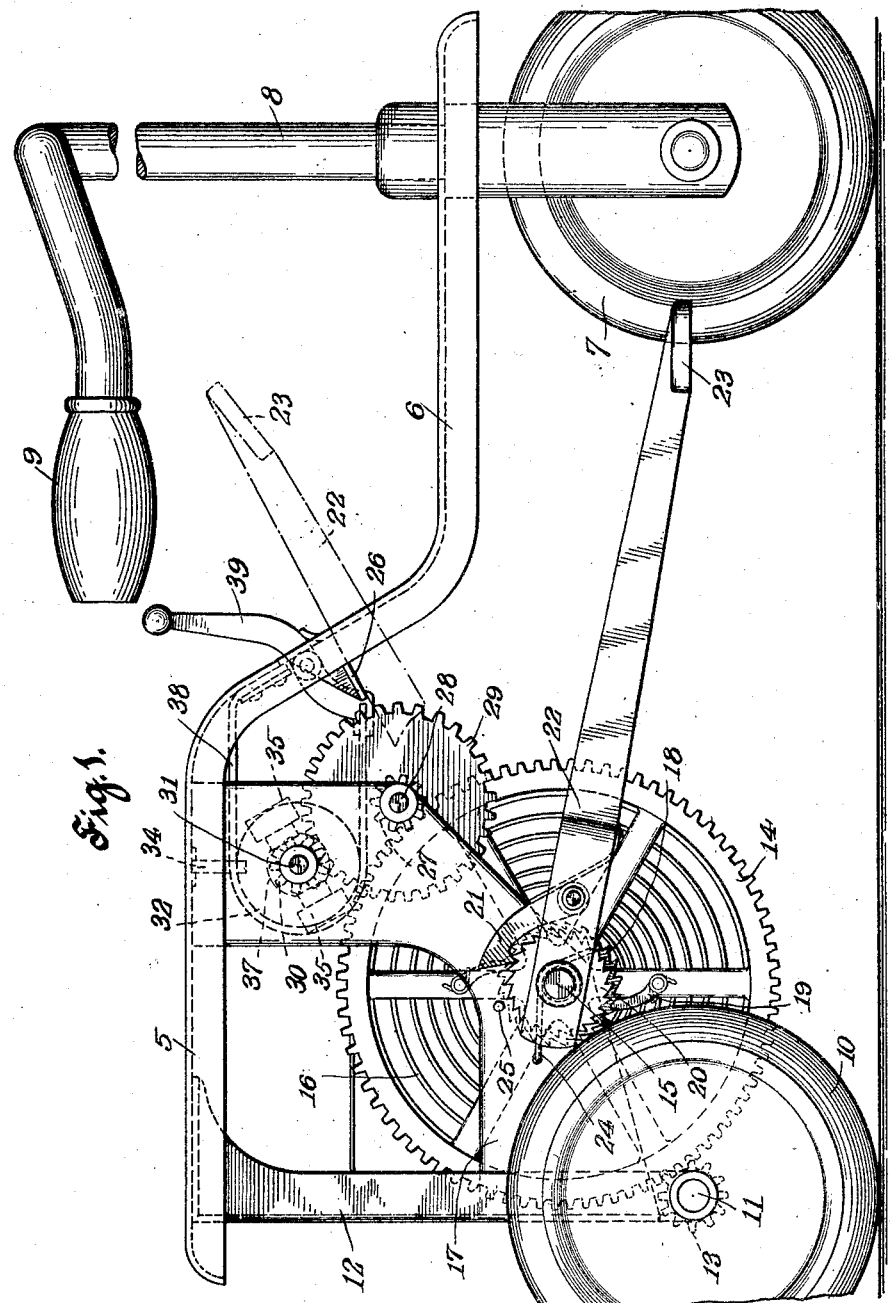

Patented Feb. 9, 1926.

1,572,051

UNITED STATES PATENT OFFICE.

JOSEPH F. SULLIVAN, OF NEW YORK, N. Y.

MOTOR VEHICLE.

Application filed June 13, 1925. Serial No. 36,864.

*To all whom it may concern:*

Be it known that I, JOSEPH F. SULLIVAN, a citizen of the United States, residing at New York city, in the county and State of New York, have invented a new and useful Improvement in a Motor Vehicle, of which the following is a specification.

This invention relates to toy motor vehicles and particularly to a device of that nature of sufficient size, strength and power to carry a child old enough to manage a mechanically operated construction. It is shown herein applied to a three wheeled vehicle of a well known popular type, but it can also be used equally well on the usual form of tricycles or small toy automobiles.

In general, the device comprises the usual running gear and steering gear of a toy vehicle with a frame altered to provide an elevated seat for the reception of a spring motor adapted to be energized by foot pedals, and controlled by an automatic governor and a hand operated brake.

As is obvious, the energizing of the motor, the brake control, and the steering of the vehicle are all very simple in nature and entirely within the capability range of anything but very young children for whom power vehicles are not practical.

My device is simple in nature, economical in construction and designed so that all the mechanism can be encased in a housing to keep out dirt, and prevent injury to the working parts.

Other advantages and details appear in the accompanying drawings in which:—

Fig. 1 is a side elevation with parts broken away.

Fig. 2 is a bottom plan view.

Fig. 3 is a sectional view on line 3—3 of Fig. 2.

As shown, the elevated portion 5 of the frame 6 serves as a seat, with a front or steering wheel 7 on which the steering post 8 with handles bars 9—9 is mounted, 10—10 indicating the driven rear wheels mounted on the axle 11 inside the support 12 therefor. The axle 11 carries a driven pinion 13 which meshes with the driving gear 14 on the main motor shaft 15 which is mounted in the side support frames 17—17.

The numeral 16 indicates a band spring secured to the gear 14, and 18 is a holding ratchet with spring pressed locking pawls 19, the spring winding ratchet being numbered 20 and the pawl therefor being indicated by the numeral 21.

The winding ratchet 20 is operated by the treadle lever 22, having the foot piece 23 and the spring 24 for the return of the treadle to its elevated position after depression, the pin 25 operating to raise the pawl 21 out of engagement with the ratchet 20 when the treadle 22 is in the said elevated position against the stop 26.

For the operation of the governor an intermediate pinion 27 meshing with the driving gear 14 and a gear 29 are mounted on the shaft 28, the said gear 29 meshing with the governor pinion 30 on the shaft 31 which also carries the brake wheel 32.

The disk 33 is also slidably mounted on the shaft 31, a stop 34 for the limitation of the movement of the said disk being provided.

Pinned on the governor shaft 31, is a collar 36 carrying one end of the governor springs 35—35 and free to move on the said shaft 31 is the second collar 37 carrying the other end of the said springs 35—35, the collar 37 being formed integrally with the disk 33.

For the braking operation there is provided a brake band 38 of the usual type with a pivoted lever 39 for hand operation.

It will be obvious from the foregoing that when the spring 16 is wound by the operation of the lever 22, and the energy therefrom is released, the rear wheels 10—10 will be rotated through the gear 14 and the pinion 13.

The frame of the vehicle may be constructed either of wood or light metal.

I do not desire to limit myself strictly to the particular form shown herewith, as there are a number of variations and modifications which are practical and within the scope of my invention.

I claim:

1. In a toy motor vehicle the combination of the following elements; a supporting frame provided with an elevated seat; means for steering the vehicle; means for propelling the vehicle comprising driving wheels and a spring motor geared thereto; means for energizing the said spring motor comprising foot operated levers adapted to wind up the spring of the said motor; and governor means for the control of the said spring motor.

2. In a toy motor vehicle the combination of the following elements; a supporting frame provided with an elevated seat, and a plurality of wheels; means for steering the vehicle comprising a steering post secured to one of the said wheels and handle bars adapted to be manually operated to turn the said steering wheel; means for propelling the vehicle comprising driving wheels mounted upon an axle provided with a pinion in mesh with a driving gear and a spring motor secured to the said driving gear; means for energizing the said spring motor comprising treadle means adapted to wind up the spring of the said motor; and governor means for the control of the said motor.

3. In a toy motor vehicle the combination of the following elements; a supporting frame; means for steering the vehicle; means for propelling the vehicle comprising driving wheels, a spring motor geared thereto, and means for energizing the said spring motor comprising levers adapted under foot pressure to wind up the spring of the said motor; and governor means adapted to control the action of the said spring motor.

JOSEPH F. SULLIVAN.